March 22, 1927.

C. T. RASCHICK

CHECK CALCULATOR

Filed March 7, 1923

1,621,686

Inventor:
Charles T. Raschick.
By Fischer & Lagaard
his Attorneys.

Patented Mar. 22, 1927.

1,621,686

UNITED STATES PATENT OFFICE.

CHARLES T. RASCHICK, OF ST. PAUL, MINNESOTA.

CHECK CALCULATOR.

Application filed March 7, 1923. Serial No. 623,539.

My invention relates to check calculators and has for its object to provide a device for quickly and efficiently calculating the total value of a number of checks of the same denomination such as used in restaurants and the like.

Another object is to provide an enveloping member in which is slidably mounted a card having printed thereon data representing the total value of a number of checks.

A further object is to arrange the data on said card in columnar formation with the value of the checks running in one direction and the number of checks in the other direction so that the total sum of any number of checks of a particular denomination may be readily procured.

A still further object is to form an edge of said enveloping member so that the same serves as an indicating means for indicating a particular row of numerals on said card as the same is slid into or out of the enveloping member.

Another feature of the invention resides in forming the body member with a recessed portion permitting the user to grasp the enveloping member without holding the card from sliding relative to said enveloping member.
A further object resides in forming the card with grooves along the sides thereof and to provide stop means attached to the enveloping member for engaging within said grooves to guide said card and serve as stops for terminating the movement thereof.

The full objects and advantages of my invention will be found in the detailed description thereof and are particularly pointed out in the claim.
In the drawings forming part of this specification:

Figure 1:
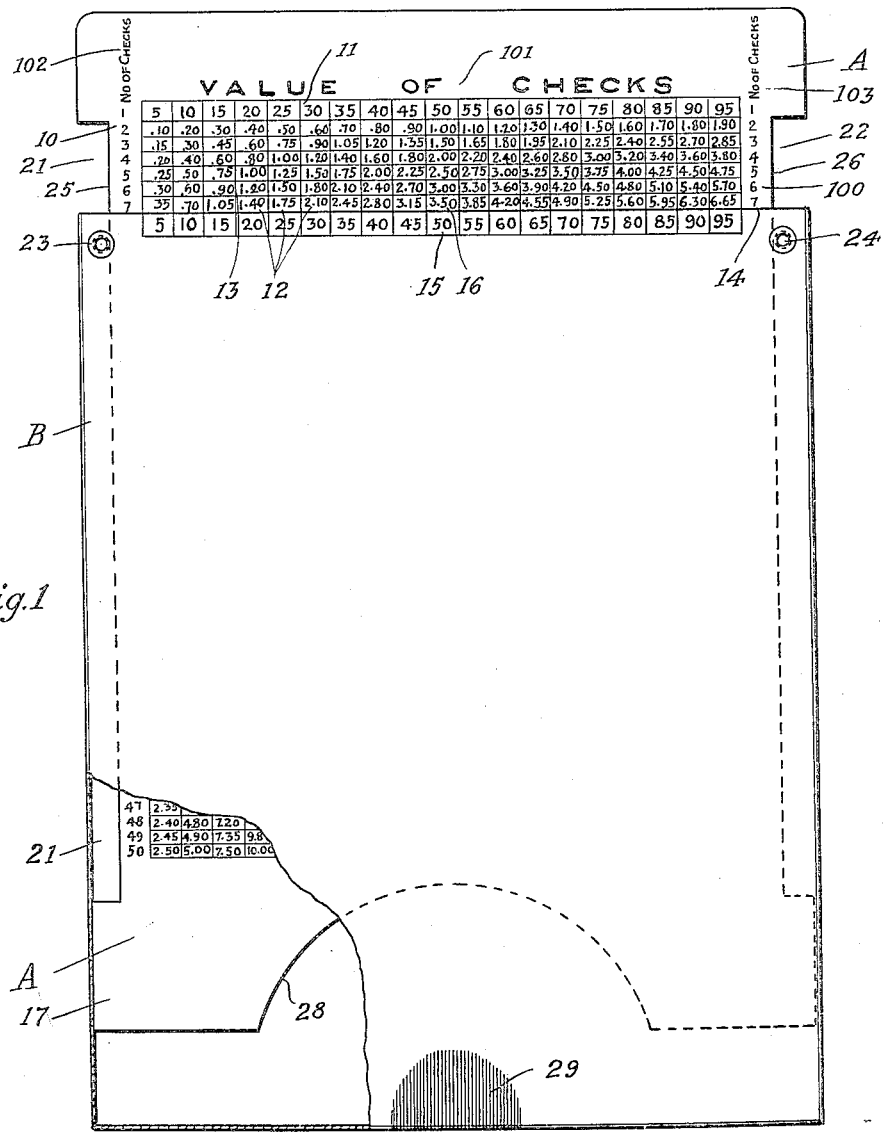
Figure 1 is a front elevational view of my invention with a portion of the same cut away to show the construction thereof.

In restaurants where a great number of checks are issued for each particular denomination of value, a great amount of time is involved by the cashier in computing the total amount of sales for a particular period. My invention provides a device which enables the cashier to readily calculate the total amount of a number of checks of the same denomination, thereby saving time and reducing errors in the calculation of the total sales.

My invention consists primarily of a card A which may be formed of cardboard or similar material and has printed on it numerals C indicating the total value of a different number of checks for different denominations and other data as will be presently described. This card is slidably mounted within an enveloping member B which is best shown in Figure 1.

Upon the face of card A is printed a column of numbers 10 ranging from one to fifty positioned at the extreme left hand margin of the same. In addition, a row of numerals indicated at 11 is printed directly opposite numeral one of column 10 which numerals 11 range by fives from five to ninety-five. The numerals 10 indicate the number of checks to be calculated while the numerals 11 indicate the denomination or value of each check. Corresponding to the intersecting of the rows of numerals 11 and the column of numerals 10 are arranged figures 12 which represent the product of the numbers in said row and column. For instance, at the intersection of number six in column 10 and number twenty in row 11 will be found a number one point twenty indicated at 13, which number represents the product of six and twenty. In other words, the total value of six checks of a denomination of twenty cents each amounts to one dollar twenty cents. It can readily be seen that this calculation table can be carried out for the balance of the numbers indicated so as to make a complete table by which the total value of the checks may be readily calculated.

For assisting the eye in readily selecting the proper number of the group of numbers 12, which corresponds to any particular product or sum desired, the extreme upper edge 14 of the enveloping member B is arranged to lie parallel to the rows of said numbers 12, as clearly brought out in Figure 1. As previously stated, the card A may be slid relative to the enveloping member B so that this edge 14 may be positioned adjacent any row of numerals 12 corresponding to any of the numbers in column 10. In addition to the row of numerals 11, I also print a similar row of numerals 15 on the extreme upper portion of the enveloping member B adjacent the edge 14, which row of numerals 15 ranges by fives from five to ninety-five inclusive and which numerals are positioned in columnar arrangement with the said numerals in row 11.

When the device is used, card A is pulled out or pushed into the member B, as the case may be, until the numeral in column 10 indicating the number of checks to be calculated appears just above the line 14. Then, by glancing along the row of numerals 15 of the row 11 and running down the corresponding column to the edge 14 of enveloping member B, the number of the group of numbers 12 appearing at this place indicates the total value of the particular checks to be calculated. If, for example, it were desired to find the total value of seven checks, each worth fifty cents, the operation would be as follows: Card A would be pulled out until the number seven of column 10 just appeared above the line 14. By then glancing along the row of numerals 15 until number fifty is reached, the desired results can be found immediately above the same, which, in this case, would be three dollars fifty cents, as indicated at 16. In this manner, similar calculations can be quickly and efficiently made so that the total value of any number of checks of the same denomination can be rapidly calculated.

Figure 2:
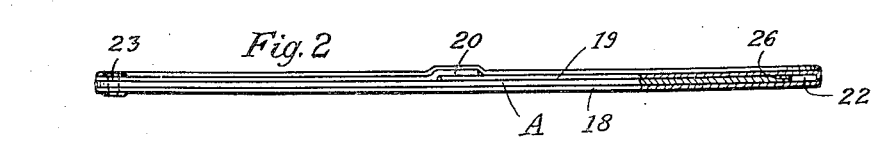
Figure 2 is a cross-sectional view of the structure shown in Figure 1 with a portion of the same shown in section.

For guiding the card A within the enveloping member B the following structure is provided: The enveloping member B is formed with a front portion 18 and a rear portion 19, which member may be constructed of cardboard or similar material and which is glued together by means of seams, such as shown at 20, in the usual manner so as to provide a structure resembling in appearance an ordinary envelope which, however, is cut straight across the top and open at the said portion thereof. The extreme lower portion of card A shown at 17 is allowed to extend below the table of numerals C printed on said card. This portion extends completely across the enveloping member B and slides snugly against the inner edges of the said enveloping member B. Above the portion 17, card A is provided with two grooves or notches 21 and 22 which notches extend somewhat below the lowermost portion of the table of numerals C and up to the upper portion of the same. In the upper corners of the enveloping member B are provided two eyelets 23 and 24 which eyelets pass through both the front 18 and the back 19 of the said enveloping member B, as shown in detail in Figure 2 and are arranged to engage against the edges 25 and 26 of the card A within the slots 21 and 22 so that the said eyelets form guides along which the upper portion of the card A may slide when said card is slid within said enveloping member for the desired purposes. In this manner, it can be seen a device is provided in which the card A may readily slide within the holder or enveloping member B so as to permit the edge 14 of said enveloping member to register with any row of numerals upon the said card. In addition, a structure is provided whereby the said card is held from removal from the enveloping member and properly guided for sliding movement within the same so that the device is at all times in readiness for use.

To provide a structure on the enveloping member by which the same may be grasped when the card A is pulled outwardly without clamping said card within said enveloping member, the following device is used. Portion 17 of card A is formed with a large semicircular notch 28 which is located in the central portion of the same near the bottom thereof. This provides a space at the bottom of enveloping member B which may be grasped by the fingers and which will not cause the card A to bind or be clamped within the said enveloping member so that the same may be readily pulled out as required. For indicating the location of the thumb grasping portion upon the enveloping member B, a reference character of some sort, such as indicated at 29, is printed upon the exterior of enveloping member B which specifies that the said enveloping member is to be grasped at this location.

Figure 3:
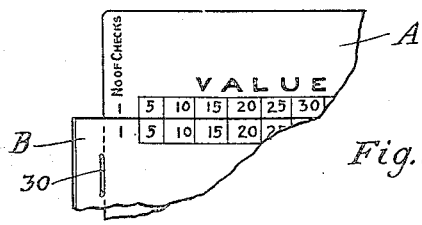
Figure 3 is a fragmentary view of the portion of the device indicated in Figure 1 disclosing another method of terminating the movement of the card of the invention.

In Figure 3, I have shown a slight modification of my invention. In this form, the groove 21 is shown as extending completely across the upper portion of the card A, while instead of the eyelet 23 an ordinary staple, such as shown at 30, is used. This structure serves the same purpose as the eyelet 23 but reduces the cost of construction of the device somewhat.

The advantages of my invention are manifect. A device is provided which is very simple in construction and which effectively and efficiently serves the desired purpose. The card within the enveloping member can not be removed from the same so that the device is at all times in condition for use. When it is desired to set aside the device, card A may be slid into the enveloping member B where the same is practically out of sight, thereby producing a structure of a convenient size.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claim.

I claim:

A calculator comprising an enveloping member, a card slidable within said enveloping member having a table thereon, said card being adapted to extend to the bottom of said enveloping member and a notch cut in said card near the central lowermost portion thereof.

CHARLES T. RASCHICK.